United States Patent [19]

Kawai et al.

[11] Patent Number: 4,785,043

[45] Date of Patent: Nov. 15, 1988

[54] PRESSURE-SENSITIVE ADHESIVE COMPOSITION PRODUCED FROM A BASE BLOCK COPOLYMER, A RESINOUS TACKIFIER, A NAPHTHENIC OR PARFFINIC MINERAL OIL, AND AN AROMATIC SYNTHETIC OIL

[75] Inventors: Kazuo Kawai; Saburo Matsubara, both of Yokohama, Japan

[73] Assignee: Nippon Oil Co., Ltd., Tokyo, Japan

[21] Appl. No.: 100,463

[22] Filed: Sep. 24, 1987

Related U.S. Application Data

[63] Continuation-in-part of Ser. No. 873,189, Jun. 11, 1986, abandoned.

[30] Foreign Application Priority Data

Jun. 14, 1985 [JP] Japan ................................ 60-127926

[51] Int. Cl.$^4$ ...................... C08J 23/00; C08L 23/00; C08L 9/00
[52] U.S. Cl. .................................... 524/272; 524/274; 524/486; 525/98; 525/99
[58] Field of Search ................. 524/272, 274, 486; 525/98, 99

[56] References Cited

U.S. PATENT DOCUMENTS

| 3,862,068 | 1/1975 | Russell | 525/99 |
| 3,917,551 | 11/1975 | Jurrens et al. | 525/99 |
| 4,089,824 | 5/1978 | Bronstert et al. | 524/274 |

FOREIGN PATENT DOCUMENTS 0023336  3/1978  Japan .

Primary Examiner—Harold D. Anderson
Assistant Examiner—Dennis R. Daley
Attorney, Agent, or Firm—Bucknam and Archer

[57] ABSTRACT

Pressure-sensitive adhesive compositions are disclosed which essentially comprise (I) a base block copolymer, (II) a resinous tackifier, (III) a selected naphthenic or paraffinic mineral oil and (IV) a selected aromatic synthetic oil. Tackiness, adhesion, cohesion and corrugated fiber board adhesiveness characteristics can be greatly improved by the addition of specified amounts of such mineral oil and aromatic oil as softeners.

4 Claims, No Drawings

PRESSURE-SENSITIVE ADHESIVE COMPOSITION PRODUCED FROM A BASE BLOCK COPOLYMER, A RESINOUS TACKIFIER, A NAPHTHENIC OR PARFFINIC MINERAL OIL, AND AN AROMATIC SYNTHETIC OIL

This application is a continuation-in-part of Ser. No. 873,189 filed June 11, 1986, now abandoned.

BACKGROUND OF THE INVENTION

1. Field of the Invention

This invention relates to adhesive compositions and more particularly to such compositions of a thermoplastic elastomer type suitable for use as pressure-sensitive adhesives.

2. Prior Art

Prior art pressure-sensitive adhesives are known which comprise elastomeric base polymers, resinous tackifiers, softeners and additives including anti-aging agents, antioxidants, fillers, colorants and the like. Such adhesives have found wide application to tapes, sheets and labels as well as carpets, hooks, thermal insulators, albums and the like. They are applied in a solution, hot-melt or emulsion form onto substrates such as cellophane, papers, plastic films, metallic foils and the like.

Elastomeric base polymers known in common use include natural rubber, reclaimed rubber, butadiene-styrene rubber, acrylonitrile-butadiene rubber, styrene-isoprene rubber, polyisoprene rubber, polybutadiene rubber, polyisobutylene rubber, chloroprene rubber, ethylene-propylene rubber, ethylene-vinyl acetate copolymer rubber and acrylic rubber.

Known tackifiers are rosins such as natural rosin, hydrogenated rosin, partially hydrogenated rosin and various rosin esters, terpene resins such as polymers of α-pinene, β-pinene and dipentene, aromatic and aliphatic petroleum resins and their hydrogenates, cumarone-indene resin, terpene phenol resin and similar resins.

Materials commonly used as softeners are naphthenic mineral oils, polybutene, chlorinated paraffin, chlorinated biphenol, chlorinated triphenol, phthalate esters such as dioctyl phthalate, and tricresyl phosphate.

Pressure-sensitive adhesives after being blended if necessary with suitable additives are dissolved in an organic solvent, hot-melted or emulsified for use as aqueous emulsions, coated onto substrates and subsequently dried or cooled. Most widely employed is the solution coating which literally involves the use of large amounts of organic solvents. There have arisen serious problems associated with adverse work environments, air pollution and fire hazards due to such solvents being highly volatile and readily flammable.

An emulsion coating is known for its high speed performance and considerable labor saving, but is not satisfactory with respect to the foregoing problems. A keen demand has therefore been voiced for the availability of an improved pressure-sensitive adhesive composition particularly suitable for hot-melt coating.

Certain thermoplastic elastomers have been proposed as base polymers for hot-melt coating, but their combination with resinous tackifiers alone still has much to be desired for adequacy of tackiness and viscosity and hence need further blending with suitable softeners.

As such softeners, there may be used petroleum oils of relatively low aromatic hydrocarbon content, i.e. naphthenic and paraffinic oils, as disclosed for instance in Japanese Patent Publication No. 44-17037 since aromatic hydrocarbons would lead to reduced cohesion. The prior art petroleum oils however have a drawback in that they are not well compatible with tackifying resins, and furthermore, not satisfactory in regard to color, odor and acid resistance.

SUMMARY OF THE INVENTION

It is the primary object of the present invention to provide improved adhesive compositions of a thermoplastic elastomer type which excel in tackiness, adhesion, cohesion and corrugated fiberboard adhesiveness characteristics.

This and other objects and advantages of the invention will be better understood from the following detailed description.

According to the invention, there is provided an adhesive composition of a thermoplastic elastomer type which comprises:

(I) 100 weight parts of a base polymer of a block copolymer or its hydrogenated derivative represented by the formula

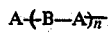

where A is a block polymer of a monovinyl substituted aromatic hydrocarbon, B is an elastomeric block polymer of a conjugated diene, and n is an integer of 1–5;

(II) 50–200 weight parts of a resinous tackifier;

(III) 5–50 weight parts of a softener which is a naphthenic or paraffinic mineral oil; and (IV) 1–40 weight parts of at least one of the following synthetic oils:

(a) a synthetic oil having a molecular weight of 173–263 and represented by the formula

where $Ar_1$ and $Ar_2$ are each benzene or alkyl benzene rings and may be the same or different, and R is an alkylene group of 2–3 carbon atoms;

(b) a synthetic oil having a molecular weight of 300–398 and represented by the formula

where $Ar_1$, $Ar_2$ and $Ar_3$ are each benzene or alkyl benzene rings and may be the same or different, $R_1$ and $R_2$ are each alkylene groups of 2–3 carbon atoms and may be the same or different; and (c) a synthetic oil having a molecular weight of 300–398 and represented by the formula

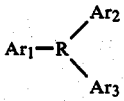

where $Ar_1$, $Ar_2$ and $Ar_3$ are each benzene or alkyl benzene rings and may be the same or different, and R is a straight-chain or branched-chain hydrocarbon group of 4–6 carbon atoms, whereby the composition is provided with an adhesive force of longer than 180 minutes as determined on corrugated fiberboard at a temperature of 25° C. and at a load of 2,000 g.

DETAILED DESCRIPTION OF THE INVENTION

Adhesive compositions of a thermoplastic elastomer type according to the present invention essentially comprise (I) thermoplastic base polymers, (II) resinous tackifiers, (III) mineral oil softeners and (IV) synthetic oils.

Base polymers used as component (I) in the invention are block copolymers and their hydrogenated derivatives represented by the formula $$A{-}(B{-}A)_{\overline{n}}$$

where A is a block polymer of a monovinyl substituted aromatic hydrocarbon, B is an elastomeric block polymer of a conjugated diene, and n is an integer of 1–5. Preferred among these block polymers are aromatic hydrocarbon polymers A with an average molecular weight of 5,000–50,000, and conjugated diene polymers B with an average molecular weight of 35,000–50,000. An integer of 1 is here preferred.

Eligible block copolymers include for example polystyrene-polybutadiene-polystyrene (S-B-S), polystyrene-polyisoprene-polystyrene (S-I-S) and hydrogenated derivatives thereof. S-B-S and S-I-S copolymers are commercially available (Cariflex TR-1101, TR-1102 and TR-1107, Shell Chemical Co.). Another S-B-S copolymer is available (Asaprene T-431, Asahi Chemical Industries Ltd.). Also marketed is polystyrene-ethylene.butylenepolystyrene (Kraton G, Shell Chemical Co.) that is a derivative resulting from hydrogenating the polybutadiene block of the S-B-S copolymer into an ethylene.butylene block.

There may be also other block copolymers of more complicated molecular structure including grafted, branched or star-shaped copolymers in which the block polymers each meet the molecular weight limits as above specified.

Resinous tackifiers used as component (II) according to the invention include for example rosins such as natural rosin, polymerized rosin, hydrogenated rosin, partially hydrogenated rosin and glycerines and pentaerythritol esters thereof, terpene resins such as homopolymers of α-pinene, β-pinene and dipentene and copolymers thereof with styrene, modified terpenes such as terpene phenol resin, petroleum resins such as aliphatic petroleum resin, aromatic petroleum resin and other petroleum resins resulting from copolymerization of aliphatic and aromatic fractions, cyclopentadiene resins, low-molecular weight styrene resins, styrene-isobutylene resins and their hydrogenates, cumarone-indene resins, and resins commonly used as tackifiers. Particularly preferred are hydrogenated rosin, partially hydrogenated rosin and their esters, terpene resins, and hydrogenates of petroleum resins for their excellent heat resistance and tackiness.

The amount of the tackifier to be used should be in the range of 50–200 parts, preferably 60–150 parts, based on the weight of the base polymer, departures from this range being responsible for the lack of balance between tackiness, adhesion and cohesion.

Softeners used as component (III) in the invention are naphthenic and paraffinic mineral oils derived from petroleum refining. The aromatics content of the mineral oils according to the invention may be up to about 20%. Greater aromatics contents should be avoided to prevent the adhesive from growing objectionably opaque, blackish green and also from being contaminated by a poisonous material present in the aromatics. Three types of softeners, naphthenic, paraffinic and aromatic, are known and graded by their respective constituent oils.

The amount of the softener to be used should be in the range of 5–50 parts, preferably 10–30 parts, based on the weight of the base polymer.

Synthetic oils used as component [IV] hereunder are high aromatic synthetic oils represented by the formulae (a) to (c) below. These oils may be used alone or in combination.

$$Ar_1{-}R{-}Ar_2 \quad (a)$$

where $Ar_1$ and $Ar_2$ are each benzene or alkyl benzene rings and may be the same or different, and R is an alkylene group of 2–3 carbon atoms. Molecular weight is 173–263.

$$Ar_1{-}R_1{-}Ar_2{-}R_2{-}Ar_3 \quad (b)$$

where $Ar_1$, $Ar_2$ and $Ar_3$ are each benzene or alkyl benzene rings and may be the same or different, $R_1$ and $R_2$ are each alkylene groups of 2–3 carbon atoms and may be the same or different. Molecular weight is 300–398.

$$Ar_1{-}R \begin{matrix} \nearrow Ar_2 \\ \searrow Ar_3 \end{matrix} \quad (c)$$

where $Ar_1$, $Ar_2$ and $Ar_3$ are each benzene or alkyl benzene rings and may be the same or different, and R is a straight-chain or branched-chain hydrocarbon group of 4–6 carbon atoms. Molecular weight is 300–398.

The aforesaid synthetic oils excel in tackiness and are transparently blackish, and what is more, they are easy and inexpensive to synthesize from aromatic compounds readily available from the petrochemicals plants.

The synthetic oils according to the invention may be obtained for instance by the reaction of styrene, α-methyl styrene or their alkyl substituted compounds with benzene or alkyl benzenes in the presence of an acidic catalyst such as sulfuric acid or a cationic ion exchange resin, or by the desalting condensation of aryl chlorides with benzene or aryl benzenes in the presence of a Friedel-Crafts catalyst. Preferably, styrene and an alkyl benzene such as xylene may be catalytically reacted to give a mixture of the above three oils which is used as it is, or as either one fraction by fractional distillation or as a combination of two selected fractions.

Typical examples of the synthetic oils include α-methylbenzyl toluene, α,α'-diemthyl toluene, α-methylbenzyl xylene, α,α'-dimethylbenzyl xylene, bis(α-methylbenzyl)toluene, bis(α-methylbenzyl)xylene, bis-(α,α'-dimethylbenzyl)toluene, bis(α,α'-dimethylbenzyl)xylene, α-methylbenzyl-α-methyl(dimethyl)benzyl benzene, 1-phenyl-1-xylyl-3-phenylbutane, 1,3,5-triphenylhexane and combinations thereof.

The above specified molecular weights of the synthetic oils should be observed to provide the desired adhesive characteristics. Greater molecular weights would lead to solidification and hence insufficient softness. Smaller molecular weights would make the adhesive low-boiling, leading to volatilization during hot-melting and also to reduced cohesion.

A choice of the synthetic oils depends upon the particular application intended. For instance, where heat resistance is required, the oils of the formulae (a) and (c) above are preferred. Reduced melting viscosity, ability to permit compatibility of the base polymer with the tackifier and high softness as well as improved tackiness and adhesion are the essential requirements to be attained by the softener.

The amount of the synthetic oil to be used should be in the range of 1-40 parts, preferably 5-20 parts, based on the weight of the base polymer. Greater amounts would fail to give sufficient cohesion.

There may be used additives such as anti-aging agents, antioxidants, fillers including calcium carbonate, clay, zinc oxide, silicic acid, carbon black and the like, viscosity regulators including waxes, colorants and the like.

The adhesive composition of the invention may be coated onto a substrate by blending and melting at a temperature of 130°-250° C., preferably 150°-200° C. Higher temperatures would invite degradation, decomposition or discoloration. Lower temperatures would lead to too high viscosity and hence insufficient dissolution in organic solvents and blending difficulties.

A hot-melt coating can be suitably effected at a coating temperatuere of 130°-250° C., preferably 150°-200° C., and at a melting viscosity of 200,000 cp or smaller, preferably 50,000 cp or smaller.

Substrates may be selected from cellophane, paper, corrugated fiberboard, cloth, films of polyethylene, polyamide and polyolefins, and metallic foils. Some of these plastic films are susceptible to thermal shrinkage in which instance the adhesive is first applied onto a thermally stable release paper and cooled and subsequently transferred onto a given plastic film.

The invention will now be further described by way of the following examples.

INVENTION EXAMPLES 1-10 AND COMPARISON EXAMPLES 1-5 FORMULATION

I. Base Polymer

Polystyrene-polyisoprene-polystyrene (Cariflex TR-1107, Shell Chemical Co.) was used in all of the examples.

II. Resinous Tackifier

An aliphatic petroleum resin (Escorez 1304, Esso Chemical Co.) was used in all of the examples.

III. Mineral Oil Softener

A naphthenic meneral oil (EPO 765, naphthenes content 45% and aromatics content 15%, Esso Chemical Co.) was used in Invention Examples 1-10 and Comparison Examples 1-4.

IV. Synthetic Oil

A distyrenated o-xylene fraction (Synthetic Oil A) was used in Invention Examples 1-10 and Comparison Example 5. This fraction was obtained by fractionating a reaction mixture resulting from reacting o-xylene with styrene in the presence of sulfuric acid (say 95%). The fraction was a mixture of the oils of the formulae (b) and (c) and had an average molecular weight of 314 and a boiling point of 340°-385° C.

Blending

A mineral oil softener, a synthetic oil and a tackifier were blended with heating in a mixer, followed by addition of a block copolymer, thereby obtaining an adhesive composition. Blending was conducted at about 180° C. for 1-2 hours.

Preparation of Test Samples

The resulting adhesive composition was viscous enough to be melted at 170°-190° C. It was hot-melt coated onto a single-sided release kraft paper (Grade 70N-018, Fujimori Kogyo K. K.) at a coat thickness of about 45 m to give an adhesive tape.

Test Methods

1. Tackiness Test

The method of J. Dow was followed. A 10 cm long, coated paper was placed obliquely at an angle of 30° with coated face up. From and onto the paper were rolled 32 steel balls ranging in diameter from 1/32 inch (No. 1 ball) to 1 inch (No. 32 ball) and each varying by 1/32 inch. Tackiness was adjudged by the maximum diameter of a ball held still on the coated side. Above No. 12 ball at an angle of 30° is preferred.

2. Adhesion Test

A test sample was contact-laminated at a stroke of 300 mm/minute onto a stainless steel plate (SUS 304) ground with wet abrasive paper by a 2,000 g weighing and 43 mm wide, laminating rubber roller. Twenty minutes afterwards, the sample was released from the fixed stainless steel plate at a temperature of 20° C., at an angle of 180° and at a speed of 300 mm/minute with use of an Instron tensile tester. Adhesion was determined by the load (g) required for this releasing. Above 700 g/25 mm is preferred.

3. Cohesion Test

A test sample was contact-laminated at an adhesion area of 25 mm×25 mm in a manner similar to the Adhesion Test. The sample was suspended perpendicularly at a load of 1,000 g. Cohesive force was measured by the length of time required for the sample to drop at 40° C. or by the displacement (mm) after lapse of 24 hours. No dropping within 24 hours and less displacements are preferred.

4. Corrugated Fiberboard Adhesiveness Test

A test sample was contact-laminated at an adhesion area of 25 mm×25 mm onto a corrugated fiberboard (230K-BF). The sample was suspended perpendicularly at a load of 2,000 g. Adhesive force was measured by the length of time required for the sample to drop at 25° C. Above 180 minutes is acceptable.

Particulars as regards the formulations and test results are shown in Tables 1 and 2.

It is to be noted that the adhesives representing Invention Examples 1-10 are all satisfactory in respect of tackiness, adhesion, cohesion and corrugated fiberboard adhesiveness. Controls of Comparison Examples 1-4 failed to give acceptable adhesion and cohesion. White smoke from the mineral oil softeners and hence volatilization took place in the case of Comparison Examples 2 and 3. Tackiness was not sufficient in the control of Comparison Example 5 without a mineral oil. All the controls revealed insufficient adhesiveness to corrugated fiberboard.

TABLE 1

Tackiness, Adhesion and Cohesion

| Example | (I) base polymer type | part | (II) resinous tackifier type | part | (III) mineral oil softener type | part | (VI) synthetic oil type | part | tackiness (ball No.) | adhesion (g/25 mm) | cohesion (displacement, mm, 40° C.) |
|---|---|---|---|---|---|---|---|---|---|---|---|
| Invention Example 1 | Cariflex TR-1107 | 100 | Escorez 1304 | 100 | EPO-765 | 10 | synthetic oil A | 10 | 12 | 2,750 | 0.4 |
| Invention Example 2 | Cariflex TR-1107 | 100 | Escorez 1304 | 100 | EPO-765 | 10 | synthetic oil A | 20 | 14 | 2,500 | 3.8 |
| Invention Example 3 | Cariflex TR-1107 | 100 | Escorez 1304 | 100 | EPO-765 | 20 | synthetic oil A | 5 | 14 | 2,500 | 0.4 |
| Invention Example 4 | Cariflex TR-1107 | 100 | Escorez 1304 | 100 | EPO-765 | 20 | synthetic oil A | 10 | 16 | 2,500 | 0.9 |
| Invention Example 5 | Cariflex TR-1107 | 100 | Escorez 1304 | 100 | EPO-765 | 20 | synthetic oil A | 15 | 17 | 2,400 | 3.0 |
| Invention Example 6 | Cariflex TR-1107 | 100 | Escorez 1304 | 100 | EPO-765 | 30 | synthetic oil A | 5 | 19 | 2,350 | 1.0 |
| Invention Example 7 | Cariflex TR-1107 | 100 | Escorez 1304 | 100 | EPO-765 | 30 | synthetic oil A | 10 | 21 | 2,350 | 2.2 |
| Invention Example 8 | Cariflex TR-1107 | 100 | Escorez 1304 | 100 | EPO-765 | 30 | synthetic oil A | 15 | 22 | 2,300 | 5.0 |
| Invention Example 9 | Cariflex TR-1107 | 100 | Escorez 1304 | 80 | EPO-765 | 25 | synthetic oil A | 20 | 19 | 2,200 | 5.0 |
| Invention Example 10 | Cariflex TR-1107 | 100 | Escorez 1304 | 120 | EPO-765 | 20 | synthetic oil A | 20 | 14 | 2,100 | 4.0 |
| Comparison Example 1 | Cariflex TR-1107 | 100 | Escorez 1304 | 80 | EPO-765 | 40 | — | — | 22 | 1,900 | dropped after 16 hrs. |
| Comparison Example 2 | Cariflex TR-1107 | 100 | Escorez 1304 | 100 | EPO-765 | 40 | — | — | 21 | 2,000 | dropped after 12 hrs. |
| Comparison Example 3 | Cariflex TR-1107 | 100 | Escorez 1304 | 100 | EPO-765 | 50 | — | — | 16 | 1,500 | dropped after 5 hrs. |
| Comparison Example 4 | Cariflex TR-1107 | 100 | Escorez 1304 | 120 | EPO-765 | 40 | — | — | 12 | 2,200 | dropped after 10 hrs. |
| Comparison Example 5 | Cariflex TR-1107 | 100 | Escorez 1304 | 100 | — | — | synthetic oil A | 30 | 10 | 3,100 | 0.6 |

(part: by weight)

TABLE 2

Corrugated Fiberboard Adhesiveness

| Example | (I) base polymer type | part | (II) resinous tackifier type | part | (III) mineral oil softener type | part | (VI) synthetic oil type | part | corrugated fiberboard adhesiveness (min, 25° C.) |
|---|---|---|---|---|---|---|---|---|---|
| Invention Example 1 | Cariflex TR-1107 | 100 | Escorez 1304 | 100 | EPO-765 | 10 | synthetic oil A | 10 | 750 |
| Invention Example 2 | Cariflex TR-1107 | 100 | Escorez 1304 | 100 | EPO-765 | 10 | synthetic oil A | 20 | 500 |
| Invention Example 3 | Cariflex TR-1107 | 100 | Escorez 1304 | 100 | EPO-765 | 20 | synthetic oil A | 5 | 350 |
| Invention Example 4 | Cariflex TR-1107 | 100 | Escorez 1304 | 100 | EPO-765 | 20 | synthetic oil A | 10 | 550 |
| Invention Example 5 | Cariflex TR-1107 | 100 | Escorez 1304 | 100 | EPO-765 | 20 | synthetic oil A | 15 | 430 |
| Invention Example 6 | Cariflex TR-1107 | 100 | Escorez 1304 | 100 | EPO-765 | 30 | synthetic oil A | 5 | 280 |
| Invention Example 7 | Cariflex TR-1107 | 100 | Escorez 1304 | 100 | EPO-765 | 30 | synthetic oil A | 10 | 240 |
| Invention Example 8 | Cariflex TR-1107 | 100 | Escorez 1304 | 100 | EPO-765 | 30 | synthetic oil A | 15 | 230 |
| Invention Example 9 | Cariflex TR-1107 | 100 | Escorez 1304 | 80 | EPO-765 | 25 | synthetic oil A | 20 | 200 |
| Invention Example 10 | Cariflex TR-1107 | 100 | Escorez 1304 | 120 | EPO-765 | 20 | synthetic oil A | 20 | 280 |
| Comparison Example 1 | Cariflex TR-1107 | 100 | Escorez 1304 | 80 | EPO-765 | 40 | — | — | 50 |
| Comparison Example 2 | Cariflex TR-1107 | 100 | Escorez 1304 | 100 | EPO-765 | 40 | — | — | 80 |
| Comparison Example 3 | Cariflex TR-1107 | 100 | Escorez 1304 | 100 | EPO-765 | 50 | — | — | 50 |
| Comparison Example 4 | Cariflex TR-1107 | 100 | Escorez 1304 | 120 | EPO-765 | 40 | — | — | 100 |
| Comparison Example 5 | Cariflex TR-1107 | 100 | Escorez 1304 | 100 | — | — | synthetic oil A | 30 | 145 |

(part: by weight)

What is claimed is:

1. An adhesive composition of a thermoplastic elastomer type which comprises:
   (I) 100 weight parts of a base polymer of a block copolymer or its hydrogenated derivative represented by the formula

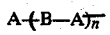

where A is a block polymer of a monovinyl substituted aromatic hydrocarbon, B is an elastomeric block polymer of a conjugated diene, and n is an integer of 1-5;
   (II) 50-200 weight parts of a resinous tackifier;
   (III) 5-50 weight parts of a softener which is a naphthenic or paraffinic mineral oil; and
   (IV) 1-40 weight parts of at least one of the following synthetic oils:
   (a) a synthetic oil having a molecular weight of 173-263 and represented by the formula $Ar_1-R-Ar_2$ where $Ar_1$ and $Ar_2$ are each benzene or alkyl benzene rings and may be the same or different, and R is an alkylene group of 2-3 carbon atoms;
   (b) a synthetic oil having a molecular weight of 300-398 and represented by the formula $Ar_1-R_1-Ar_2-R_2-Ar_3$ where $Ar_1$, $Ar_2$ and $Ar_3$ are each benzene or alkyl benzene rings and may be the same or different, $R_1$ and $R_2$ are each alkylene groups of 2-3 carbon atoms and may be the same or different; and
   (c) a synthetic oil having a molecular weight of 300-398 and represented by the formula

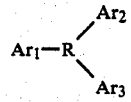

where $Ar_1$, $Ar_2$ and $Ar_3$ are each benzene or alkyl benzene rings and may be the same or different, and R is a straight-chain or branched-chain hydrocarbon group of 4-6 carbon atoms, whereby, the composition has an adhesive force of longer than 180 minutes as determined on corrugated fiberboard at a temperature of 25° C. and at a load of 2,000 g.

2. The adhesive composition according to claim 1 wherein said base polymer is polystyrene-polybutadiene-polystyrene, polystyrene-polyisoprene-polystyrene, or polystyrene-ethylene.butylene-polystyrene.

3. The adhesive composition according to claim 1 wherein said resinous tackifier is rosin, terpene resin, petroleum resin, cyclopentadiene resin, low-molecular weight styrene resin, styrene-isobutylene resin or cumarone-indene resin.

4. The adhesive composition according to claim 1 wherein said synthetic oil is α-methylbenzyl toluene, α,α'-dimethylbenzyl toluene, α-methylbenzyl xylene, α,α'-dimethylbenzyl xylene, bis(α-methylbenzyl)toluene, bis(α-methylbenzyl)xylene, bis(α,α'-dimethylbenzyl)toluene, bis(α,α'-dimethylbenzyl)xylene, α-methylbenzyl-α-methylbenzyl benzene, α-methylbenzyl-α-dimethylbenzyl benzene, 1-phenyl-1-xylyl-3-phenylbutane or 1,3,5-triphenylhexane, or a combination thereof.

* * * * *